Patented July 5, 1932

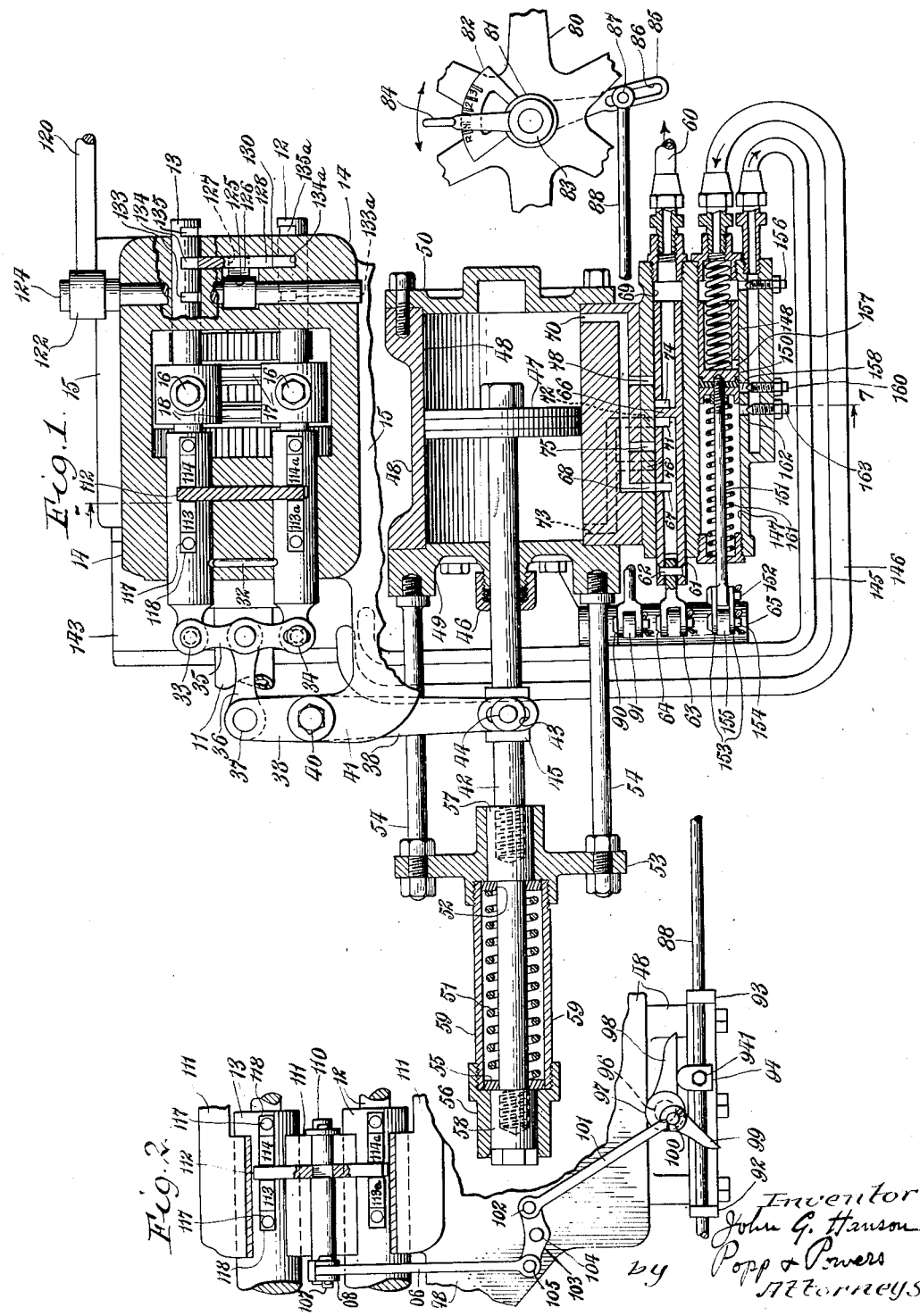

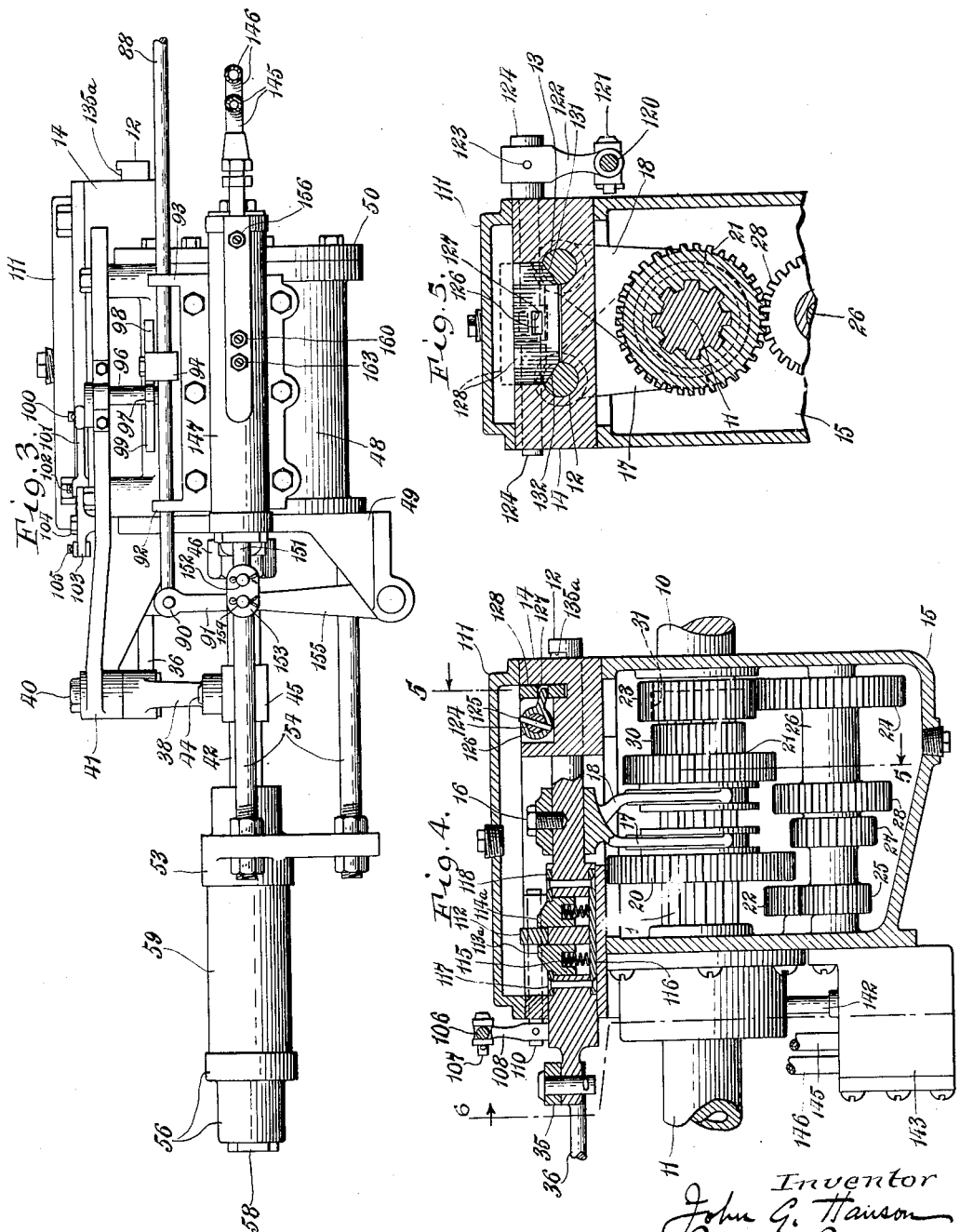

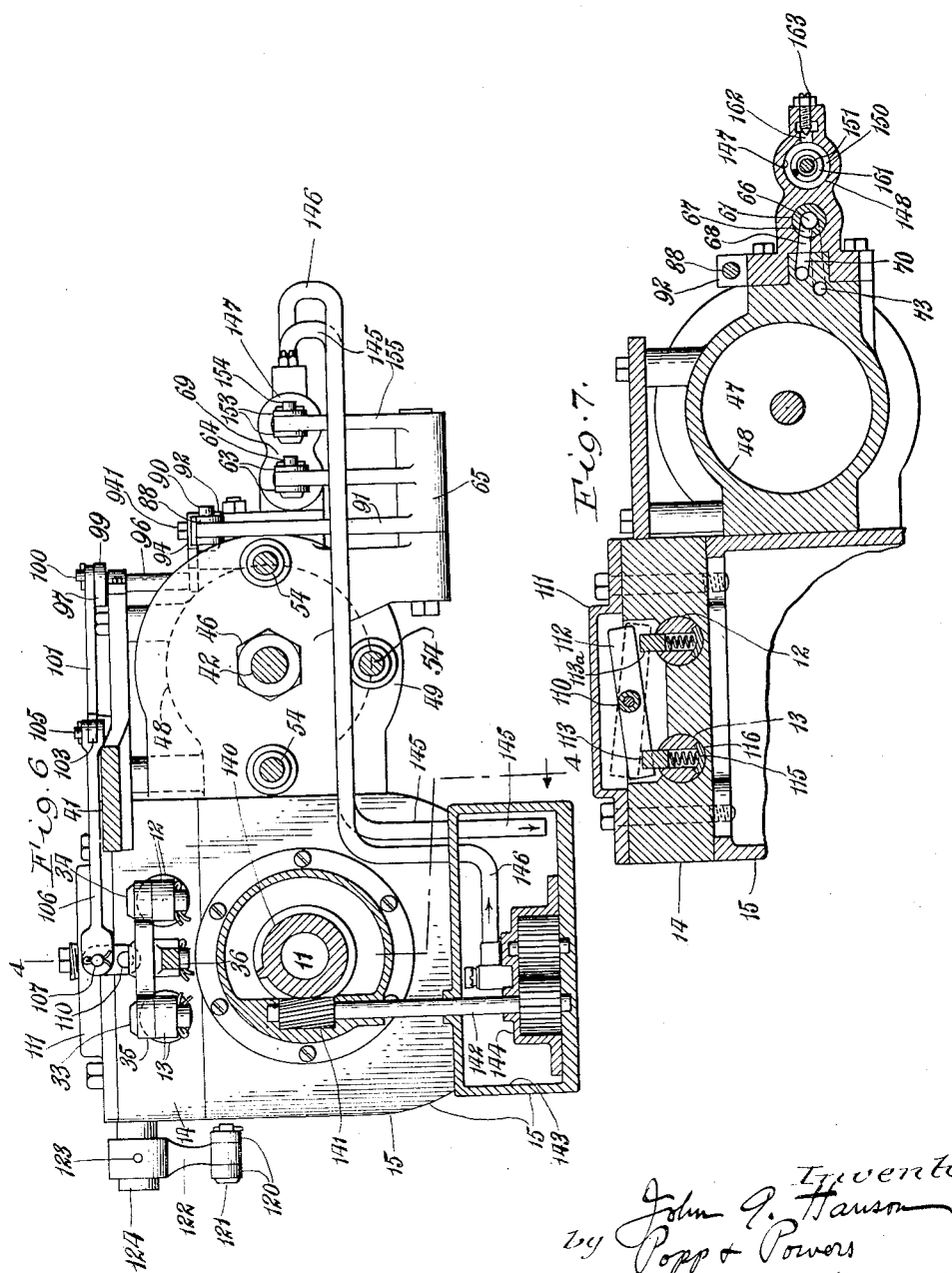

1,865,690

UNITED STATES PATENT OFFICE

JOHN G. HANSON, OF KENMORE, NEW YORK

GEAR SHIFT

Application filed December 26, 1931. Serial No. 583,200.

This invention relates to a semi-automatic fluid actuated mechanism for shifting the gears of automobiles and other similar vehicles.

The principal object of the invention is to eliminate most of the manual operations required in the present standard gear shift, and to entirely eliminate the usual gear shift lever which extends upwardly from the gear box and obstructs the driver and passengers in the front seat of the vehicle. The specific object of the invention is to eliminate all hand operations in effecting different gear ratios, except when it is desired to go into low or reverse gear, all of the other gear shifting being dependent only on the actuation of the clutch pedal. Numerous other objects of the invention and practical solutions thereof are disclosed in detail in the herein patent specification.

The present invention is an improvement of my gear shift Patent No. 1,830,395 issued Nov. 3, 1931.

In the accompanying drawings:

Figure 1 is a top plan view, with parts broken away, of my improved gear shift mechanism.

Figure 2 is a fragmentary top plan view of the same, indicating some of the portions which were cut away to obtain the view of Fig. 1.

Figure 3 is a "right" side elevation of the gear shift mechanism.

Figure 4 is a vertical longitudinal section through the gear box and associated parts, taken on line 4—4 Fig. 6.

Figure 5 is a vertical transverse section through said gear box, taken on line 5—5 Fig. 4.

Figure 6 is a rear elevation of the entire mechanism taken on line 6—6 Fig. 4.

Figure 7 is a fragmentary, vertical, transverse section through the gear box and associated parts, taken on line 7—7 Fig. 1.

Similar characters of reference indicate like parts in the several figures of the drawings.

My invention may be embodied in various forms and in gear shifts of different constructions, and the present application is therefore to be regarded merely as one organization which satisfactorily carries out the invention in practice. As here shown, the same is constructed as follows:—

The numeral 10, (see Fig. 4), indicates the ordinary drive shaft of an automobile which is directly coupled with the crank shaft of the internal combustion engine (not shown) which propels said automobile. The entire purpose of the present invention is, in common with all gear shift mechanisms, to vary the gear ratio between this power shaft 10 and the propeller shaft 11, the latter being operatively connected with the differential and rear wheels of the automobiles in the usual and well-known manner. The direct mechanical means whereby these various gear ratios are effected is, in the present instance, accomplished in the customary manner by means of a pair of shift rods 12 and 13 which are horizontally, longitudinally and slidably disposed in the upper section 14 of the gear box 15. Secured by set screws 16 or otherwise to said shift rods 12 and 13 are bifurcated arms or shift forks 17 and 18, the former of which engages with a peripheral groove in the low-reverse shift gear 20, while the shift fork 18 engages with a similar peripheral groove in the high-intermediate shift gear 21.

In the drawings these shift gears 20, 21 are shown in their neutral position but both are splined upon the propeller shaft 11 and are adapted to be moved either forwardly or rearwardly thereon by their companion shift forks 17 and 18. Secured to the rear end of the drive shaft 10 is a drive pinion 23 which is at all times in mesh with a jack shaft drive gear 24 secured to the forward end of a jack shaft 26, the latter being thus directly coupled to said drive shaft 10. When the shift gear 20 is moved rearwardly into engagement with the reverse pinion 22, power is taken off from said jack shaft 26 through the "reverse" pinions 25 and 22 and delivered through aforesaid low-reverse shift gear 20 to the propeller shaft 11.

On the other hand when said shift gear 20 is moved in a forward direction from the neutral position illustrated, the power is taken off from said jack shaft through the "low" jack shaft pinion 27 and delivered to the propeller shaft 11. In a like manner a rearward movement of the high-intermediate shift gear 21 from the neutral position illustrated causes said shift gear 21 to mesh with the intermediate jack shaft gear 28, while a forward movement of said shift gear 21 moves its gear shaped hub 30 to move within and into engagement with the internal gear 31 which is formed in the bore of the constant mesh drive pinion 23.

It is obvious (see Fig. 1) that either the shift rod 12 or the shift rod 13 must remain in its neutral position while its companion shift rod 12 or 13 is being moved longitudinally either forward or backward, and, to insure such a relationship, the usual form of locking pin 32 is provided, the same being horizontally, transversely and slidingly arranged in the upper gear box section 14 and adapted to engage with either one of a pair of detaining notches formed in the shift rods 12 and 13.

Pivoted at 33 and 34 to the ends of said shift rods 12 and 13 is an equalizing lever or whipple-tree 35 to the center of which is pivoted the rear end of a link 36. The rearward end of said link 36, is in turn, pivoted at 37 to a rock lever 38. The latter is fulcrumed at 40 on the arm 41 of the upper gear box section 14.

The outer end of said rock lever 38 is slidably pivoted to the piston rod 42, being provided with an elongated slot 43 which receives or embraces a pin or stud 44, the latter projecting vertically upward from a block 45 formed integrally upon said piston rod 42.

The front end of said piston rod 42 passes through a suitable packing gland 46 and is provided at its extreme front end with a piston 47, the latter being adapted to move within a cylinder 48 either forwardly or rearwardly from the neutral position illustrated in the drawings. Said cylinder is capped at its opposite ends with suitable cylinder heads 49 and 50 secured in place by cap screws.

This piston 47 is at all times resiliently urged toward the central position shown in the drawings. This resilient centralizing is accomplished by means of a horizontal, longitudinal, centering spring 51 which bears with its front end against a washer 52. The latter is prevented from forward movement beyond the position shown in the drawings by the yoke 53 which is secured to the rear piston head by stanchions 54. Similarly, the opposite or rear end of said centering spring 51 bears against a washer 55 which is restrained against rearward movement beyond the position shown in the drawings by the inner vertical face of a cap 56, the latter being secured to said yoke 53 by a tubular spring casing 59. When the piston 47 moves either forwardly or backwardly either the one or the other of these washers 52 or 55 is moved, against the resistance of the centering spring 51, toward the central part of the centralizing spring chamber 54 by reason of the enlarged portions 57 and 58 of the piston rod 42. Thus by the use of the single spring 51 the piston 47 is yieldingly urged toward its central position whenever said piston is in either its forward or its rearward position.

The actuation of the piston 47 is affected by the subatmospheric pressure or partial vacuum existing in the intake manifold of the internal combustion engine, said intake manifold being tubularly connected with the herein gear shift mechanism by a suction tube 60. The control of the air flow due to this partial vacuum is effected by means of a tubular suction control valve 61, the rear end of which is bifurcated and is pivotally connected at 62 to a link 63. The rear end of said link is likewise bifurcated and is pivotally connected at 64 to a rocking head 65. Atmospheric air is admitted into the rear hollow end of said suction valve through the space intermediate of its bifurcated arms, the pressure of this air being of course that of the prevailing atmospheric air pressure. The central part of said suction valve is provided with a division, partition, or wall 66 thus dividing the hollow interior of said valve into front and rear bores. The rear bore is always under atmospheric air pressure while in the front bore at all times prevails a pressure equal to that in the intake manifold of the engine. This results from the fact that the front end of the tubular suction valve is open and thus communicates directly with the cylindrical valve casing 69 which is in turn in communication with the suction tube 60.

In the position shown in the drawings the tubular suction valve 61 is in its neutral position, the air in the rear bore of said valve being free to pass through a rear air slot 67 into a valve port 68 and thence to the front end of the cylinder 48 through a duct 70. At the same time this air pressure in the rear bore of said suction valve 61 is free to pass through a front air slot 71 into a port 72 and thence to the rear end of the cylinder 48 through a duct 73. In this position of said valve the air pressure in the rear bore of said suction valve 61 is thus free to pass to both ends of the cylinder 48 and hence there is no unbalanced pressure on either side of the piston 47 which is thus forced to assume its central position by reason of the centralizing spring 51. In this position of the suction valve the suction slot 74 which is in front of the partition 66, is out of register with all the ports in the valve casing and hence, in this position there is no possibility of a flow of air into the intake manifold of the engine through the suction pipe 60.

Said suction control valve 61 is adapted to be moved by the rocking head 65 into four successive positions located at equally spaced intervals rearwardly of the "neutral" position shown in the drawings.

In the first position of said suction valve its front air slot 71 registers with a port 75 allowing air to flow through the duct 70 to the front end of the cylinder 48 at the same time the suction slot 74 has been shifted into register with the port 72, thus venting the air from the rear end of the cylinder. This causes the piston 47 to move rearwardly as a consequence of this first position of the suction valve. In the second position of said valve the air slot 71 registers with a port 76 leading through the duct 73 to the rear end of the cylinder, while the suction slot 74 registers with the port 75 communicating with the front end of said cylinder. This causes the piston 47 to move forwardly. In the third position of the suction valve the front air slot 71 registers with port 68 and the suction slot 74 with the port 76 which latter communicates through the duct 73 with the front end of the cylinder. Hence this third position of the suction valve causes a rearward movement of the piston 47.

If on the other hand the suction valve be moved one step forwardly (reverse gear position) of the position shown in the drawings the rear air slot 67 registers with the port 76 and the suction slot 74 registers with a port 78 communicating with the front end of the cylinder 48 through the duct 70. Hence, in this "reverse" position of the suction valve, the piston 47 is caused to move forwardly.

One method of moving this suction valve 61 to any one of its five positions is shown at the right of Fig. 1. Here is shown a fragmentary top plan view of a steering wheel 80 which is rotatably arranged on a stationary steering post 81. Secured to said steering post is a quadrant 82 preferably notched in five positions and suitably marked R, N, 1, 2 and 3 indicating the reverse, the neutral and the three forward gear box ratios. Rotatably arranged within said stationary steering post 81 is a control rod 83 to the upper end of which is secured a hand lever 84 engaging with any one of the five notches of the quadrant 82. Secured to the lower end of said control rod 83 is an actuating arm 85 provided with a radial slot 86. Slidably disposed in said slot is a pin 87 secured to the extreme front end of a draw bar 88, the rear end of which is pivoted at 90 to an upstanding arm 91 of aforesaid rocking head 65. Thus, by suitably positioning the hand lever 84 in the desired notch of the quadrant 82, the draw bar correspondingly moves to partially rotate the rocking head 65 in the one or other direction and thus to position the suction valve 61 in the desired location so as to either cause the piston to be centralized, as shown, or to be moved either forwardly or backwardly from said centralized position.

The central part of said draw bar 88 (see Fig. 2) is suitably guided in a pair of posts 92 and 93 which project upwardly from the main cylinder casting 48. Intermediately of said posts is a shoe 94 which is secured to the draw bar 88 by a set screw 941 or otherwise. Pivoted vertically to the main cylinder casting 48 at 96 is a bell crank cam 97 having a pair of obliquely extending radial arms 98 and 99. Pivoted vertically and eccentrically at 100 to the hub of said bell crank cam 97 is a horizontal link 101, the inner terminus of which is pivoted at 102 to the front arm of a bell crank lever 103, the latter being vertically pivoted at 104 to the main cylinder casting 48. The rear arm of said bell crank lever 103 is vertically pivoted at 105 to the outer end of a link 106 whose inner end is horizontally and longitudinally pivoted at 107 to the upstanding, bifurcated arm 108 of a rock shaft 110. The latter is horizontally and longitudinally journaled in the upper section 14 of the gear box 15 (see Figs. 2, 4, 5, 6 and 7). Said cover is transversely slotted to receive a symmetrical walking beam 112, the central part of which is secured to the rock shaft 110.

The shift rods 12 and 13 are provided with pairs of vertically slidable dogs 113, 114 and 113a, 114a respectively, the upper face of the same being oppositely bevelled as best shown in Fig. 4. Each of said dogs is yieldingly pressed upward by a companion compression spring 115 resting on a bridge plate 116 which is secured to its companion shift rod 12 or 13, as the case may be, by rivets 117. Each of the latter is also employed to hold in place a limiting cleat 118 which limits the upward movement of its companion dog.

The automobile of which the present invention forms a component part of course is provided with the usual clutch and clutch pedal (not shown). Said clutch pedal is operatively connected with a drag link 120 in such manner that when the clutch is released (clutch pedal depressed) said drag link 120 is moved forward. The rear end of said link is pivoted at 121 (see Fig. 5) with the lower or outer end of a crank arm 122, the hub of which is secured by a taper pin 123 or otherwise to a horizontal, transverse shaft 124. Said shaft is suitably journaled in the upper section 14 of the gear box 15 and has secured to its central portion (by a pin 125 or otherwise) a rearwardly and radially extending lifting tongue 126. The outer end of said tongue is received within a rectangular, horizontal slot 127 formed centrally in a vertical transverse locking plate 128. The latter is vertically slidable in a vertical guideway 130 which is suitably formed in the upper section 14 of the gear box 15. The outer lower corners of said locking plate are bevelled at 131, 132, the bevelled portion 131 being adapted to engage with any one of a series of notches 133, 134 and 135 which are milled obliquely in the shift rod 13, while the bevelled portion 132 of said locking plate 128 is adapted to engage with any one of a series of notches 133a, 134a and 135a.

*Operation when manually controlled*

All of the drawings show all of the various operating parts in their neutral positions in which case no power is being delivered from the drive shaft 10 to the propeller shaft 11, so that now power is being delivered by the engine to the rear wheels of the automobile. We will now assume that the operator wishes to reverse the car, the engine having already been started. He first pushes the hand lever 84 into the notch marked R, thereby causing the suction control valve 61 to move one station to the front of that illustrated. This permits air pressure to pass from the rear bore of said suction valve through the rear air slot 67 and into the port 76 and thence to the rear end of the cylinder. At the same time suction slot 74 is in register with the port 78 and hence the front end of the cylinder 48 is put into communication with the suction pipe 60 which connects with the intake manifold of the engine. This condition of affairs causes an unbalanced air pressure on opposite sides of the piston 47 tending to move the same forwardly. No actual movement however of said piston can occur until the automobile clutch pedal is depressed, which operation causes the locking plate 128 to be lifted out of the notches 134, 134a.

This permits of longitudinal movement of both of said slide bars 12 and 13 as far as the effect of the locking plate is concerned. The one slide bar 13 is however prevented from moving in either direction by reason of the walking beam 112 which at this time (see Fig. 7) has its one end depressed in between the dogs 113, 114 of said slide bar 13. The other slide bar is however free to move, and, inasmuch as the piston is being urged forwardly, it follows that the whipple tree 35 is urged rearwardly, but inasmuch as its one pivot 33 is held stationary it follows that its other pivot 34 is moved rearwardly. This causes the shift rod 12 to move rearwardly with its fork 17 and hence to move the low-reverse shift gear 20 into engagement with the reverse idler pinion 22. This establishes a reverse gear connection in the gear box 15 so that, when the operator then releases the clutch, the automobile will travel in a reverse direction.

In the foregoing description it has been assumed that the operator first moved the hand lever 84 to its reverse position and thereafter depressed the clutch. It is obvious however from the construction of the herein invention, that this operating sequence may be reversed if the operator so desires, that is, he can first depress the clutch and then push the hand lever 84 to any desired position.

We will now assume that with the car travelling in a reverse direction, the operator desires to bring the car to a stop without disengaging the reverse gear. To do this he merely depresses the clutch and applies the brakes in the usual manner, no change in the gear box taking place as long as the hand lever 84 is not shifted. Thus if he desires he can again let in the clutch and continue to travel in reverse gear.

We will now assume that the operator desires to return to neutral. For this he merely shifts the hand lever 84 to the neutral position, thereby returning the piston 47 to the position shown in the drawings in which both sides of said piston are subjected to atmospheric air pressure and hence no pressure being exerted in either direction upon said piston. The latter is however at all times under the influence of the centering spring 51, which under such a balanced air pressure condition causes the piston to be moved rearwardly to its central position. Such a rearward movement causes a forward movement of the pivot 34 of the whipple tree 35 and hence, a forward movement of shift rod 12 and a disengagement of the low-reverse shift gear 20 from the reverse pinion 22.

If the operator now wishes to go into low gear, he merely pushes the hand lever 84 to the low position. This causes the suction valve to so move as to open the front end of the cylinder 48 to atmospheric air pressure and to connect the rear end of said cylinder with the intake manifold suction pipe 60. This causes the piston 47 to tend to move rearwardly against the resistance of the centering spring 51 which tendency turns into an actuality just as soon as the clutch pedal is depressed and the locking plate 128 lifted as a consequence. If the operator now releases the clutch pedal, the automobile will be propelled forwardly at a low gear ratio.

We will now assume that the operator wishes to shift to second or intermediate gear. To do this he just moves the hand lever to the number 2 (second gear) notch of the quadrant 82. This action correspondingly moves the suction valve 61 into its second rearward position in which position atmospheric air is fed to the rear end of the cylinder 48 through slot 71 and port 77, while air is vented from the front end of said cylinder to the suction pipe 60 through port 75 and suction slot 74. This tends to move the piston forwardly.

In the foregoing discussion of neutral, reverse gear ratios no mention has been made of the shoe 94 (see Fig. 2). It should be now noted that this shoe 94 has (for the neutral, reverse and low positions of the draw bar 88) been merely idly sliding along the vertical, parallel, longitudinal face of the front arm 98 of the bell crank cam 97. Hence no movement has been imparted to any of the parts actuated by said cam, and, in particular no change of position has been caused in the walking beam 112. As we are now assuming a shift into second gear however, this condition of affairs is altered, the shoe 94 moving rearwardly beyond the axis of the pivot 96 and engaging with the rear arm 99 of said bell crank cam 97 and thereby causing a partial clockwise rotation of the same. This movement causes a partial rotation of the rock shaft 110 and hence a reversal of position of the walking beam 112 to the dotted line position of Fig. 7. This brings said walking beam down upon the upper face of the shift rod 12.

To now continue the just interrupted sequence of shifting from first to second gears, we will now assume that the operator depresses the clutch pedal thereby freeing the rear ends of the shift rods 12 and 13. The pressure tending to move the piston 47 forwardly is now free to actuate the whipple tree 35 in a rearward direction. In this case both said shift rods 12 and 13 will tend to be moved rearwardly.

The one shift rod 12 is first moved rearwardly. As this occurs, the dog 113a moves beneath the adjacent end of the walking beam 112 and is caused thereby to be depressed against its spring 115 until said walking beam clears the rear vertical face of said dog, whereupon it immediately moves upwardly to the position shown in the drawings under the influence of its spring 115. Any further rearward movement of this shift rod 12 is however prevented by reason of the dog 114a which has now moved rearwardly so that its flat vertical, rear face is in direct contact with the adjacent front face of the walking beam 112. This shift rod 12 is now in its neutral position. Thereupon the other shift rod 13 will be moved to the rearward limit of its movement, that is until the high-intermediate shift gear 21 is moved rearwardly into engagement with the "second" jack shift gear 28. The operator now releases the clutch pedal and the car is propelled forwardly in second gear.

When the operator wishes to then shift to third gear the procedure is similar to the foregoing. The suction valve 61 is first moved to its extreme rearward position by the hand lever 84, this movement having no effect on the walking beam 112 (assuming that the operator has just shifted from second) inasmuch as the shoe 94 has merely, during this movement, slid idly along the parallel flat outer face of the front arm 99 of the bell crank cam 97. This particular position of the suction valve causes the piston 47 to move rearwardly and the whipple tree 35 forwardly, thereby causing a forward movement of the shift rod 13 and a direct engagement of the gear-shaped hub 30 of the high-intermediate shift gear 21 with the internal gear 31.

*Automatic control of second and third gears*

Heretofore we have only considered the movement of the suction valve 61 as a consequence of the manual moving of the hand lever 84. We will now describe how the shift from first to second and from second to third gears may and usually will be accomplished in a semi-automatic manner.

Secured to the propeller shaft 11 (see Fig. 6) is a driving spiral gear 140 which meshes with a driven spiral gear 141 secured to the upper end of an upright pump shaft 142 suitably journaled on the gear box casting 15. Arranged in the lower rear part of said gear box casting is an oil receptacle 143 which is adapted to contain an ample supply of non-freezing oil. Secured to the floor of said oil receptacle 143 is a gear pump 144 which derives its power from aforesaid shaft 142. Oil passes into said oil reservoir from a return oil pipe 145 and is discharged from the oil pump 144 through a pressure oil pipe 146.

This oil pipe conveys the oil under pressure to the front end of a horizontal, longitudinal, cylindrical, oil-valve casing 147 in which is slidably arranged a cylindrical and tubular oil valve 148 provided with a solid head 150. This head is preferably provided with a leather washer and is secured to the rear end of a horizontal longitudinal rod 151, the rear end of which is pivoted at 152 to the front end of a pair of cooperating links 153. The rear ends of said links 153 are pivoted at 154 to an upstanding arm 155 integrally formed on the rocking head 65.

Any movement of this hollow oil valve 148 effects a corresponding movement in the suction control valve 61 and thereby affects the actuation of the piston 47 and the gear shifting mechanism, including the actuation of the rocking beam 112. The position, which this oil valve takes, is a function of the speed of the car, inasmuch as the oil pressure of the discharge from the oil pump 114 is proportional to the car speed which latter is a directly proportional function of the speed of the propeller shaft 11 and hence of the road speed of the automobile itself.

Manifestly, when the automobile is stationary, no oil under pressure is being delivered to said oil valve and hence to start the automobile moving in either a forward or reverse direction, manual manipulation of the hand lever 84 is required. So that the oil valve 148 will offer no undue resistance to this manual operation, an adjustable bleeder valve 156 is provided which tubularly connects the pressure oil pipe 146 with the return oil pipe 145 at a point adjacent the rear end of the oil valve 148.

It is to be understood that when the car is travelling in reverse this oil valve has no function whatever.

When the operator desires to start in a forward direction he first manually moves rearward both the suction valve 61 and the oil valve 148. Assuming for the present that he is starting in low gear, this will move the slot 157 of the oil valve into register with the first oil port 158 which allows the oil to flow into the return oil pipe 145 through a needle valve 160. As the speed of the car and the oil pressure correspondingly increases, even though opposed by a compression spring 161, said pressure finally reaches an amount which cannot be adequately relieved by this by-pass through said slot 157 and port 158 and the oil valve will move rearwardly a short distance thereby causing said slot and port to be out of perfect register. The instant that this occurs, the flow through said by-pass will be decreased, thereby increasing the fluid pressure against the front face of the head 150 and causing a still further rearward movement of the oil valve 148 until the flow through this first adjustable by-pass is closed entirely and the full oil pressure directed against the head 150 of said oil valve. This causes the latter to instantly move rearward until the slot 157 registers with a second oil port 162.

It can be readily understood that, in actual practice, this movement of the oil valve 148 is almost instantaneous because, as soon as said valve starts to move, it immediately cuts down and at an increasing rate the oil resistance to its forward movement until negative acceleration occurs as the slot 157 moves into register with the second oil port 162 due to a reversal of this pressure caused by oil resistance.

At this point the oil valve is forced to linger inasmuch as the compression spring 161 is now under a considerably higher pressure than it was in the first position. The same action however, occurs again in a manner analogous to that just described, that is, as the car gradually gains speed, the oil pressure from the oil pump 144 finally reaches a point where an infinitesimal rearward movement throwing said slot 157 and port 162 out of perfect register occurs. Thereupon the valve instantly moves to its extreme rearward position.

It is obvious that the exact speed of the automobile at which this oil valve is to move from one of its stations to the next is adjustable by means of the needle valves 160 and 163, the former governing the speed at which a shift can be semi-automatically made from first to second, while the needle valve 163 governs the speed at which a shift can be semi-automatically made from second to high gear.

It is to be understood that this operation is semi-automatic in that the driver at all times retains control over the movement of time when the shift is actually to be made. In other words, the oil valve takes the place of the manual manipulation of the hand lever 84 as to all movements of said lever between the first, second and third speed positions. The actual shift of the gears is at all times only rendered possible by the releasing of the clutch by the operator, so that he has the car in full control at all times.

Under certain conditions, the operator may prefer to change from first to second or third, or from second to first, or third at a speed different from that set by the needle valves 160, 163. It is for this reason that the manual hand lever 84 is suitably indexed for all the gear box speeds. By this means the operator can push said hand lever to any speed he wishes, and then momentarily release and re-engage the clutch, this operation being possible of being superimposed upon the semi-automatic operation of the oil valve by reason of the fact that said oil valve is actuated, solely by fluid pressure which can be overcome by a sufficient manual pressure against it in the one or other direction. It should also be noted that in thus overcoming the semi-automatic functioning of the oil valve 148, it is not necessary to hold the hand lever for any considerable length of time, but merely to move the same into the desired position and to, if desired, simultaneously depress the clutch pedal.

It is apparent from all of the foregoing that the herein invention is very simple in view of what it is capable of performing; that it is durable and practical and not liable to get out of order and that it combines the best features of automatic control with sufficient manual control to permit the operator to most efficiently navigate with the maximum of efficiency and the minimum of effort. Furthermore the source of power used to actuate the mechanism is derived from the intake manifold of the engine, thereby eliminating the troublesome apparatus, tanks, etc. heretofore used as a source of this power.

I claim:

1. A gear shift associated with the motor, gear box, propeller shaft and clutch of a vehicle and comprising: a cylinder; a suction tube tubularly connected with the intake manifold of the motor; a suction valve interposed between said cylinder and said suction pipe; a piston arranged in said cylinder and operatively connected with the shift rods of said gear box; an oil valve having a succession of ported positions and operatively connected to said suction valve; and an oil pump connected to the propeller shaft and adapted to actuate said oil valve.

2. A gear shift associated with the motor, gear box, propeller shaft and clutch of a vehicle and comprising: a cylinder; a suction tube tubularly connected with the intake manifold of the motor; a suction valve interposed between said cylinder and said suction pipe; a piston arranged in said cylinder and operatively connected with the shift rods of said gear box; an oil valve having a succession of adjustable ported positions and operatively connected to said suction valve; and an oil pump connected to the propeller shaft and adapted to actuate said oil valve.

3. A gear shift associated with the motor, gear box, propeller shaft and clutch of a vehicle and comprising: a cylinder; a suction valve controlling the admission of fluid into said cylinder; an oil pump connected with the propeller shaft of the vehicle; an oil valve actuated by the oil pressure from said oil pump; a hand lever connected to both said suction valve and oil valve; and a piston in said cylinder and operatively connected with the shift rod of the gear box.

4. A gear shift associated with the motor, gear box, propeller shaft and clutch of a vehicle and comprising: a cylinder; a suction tube tubularly connected with the intake manifold of the motor; a suction valve interposed between said cylinder and said suction pipe; a piston arranged in said cylinder and operatively connected with the shift rods of said gear box; an oil valve operatively connected to said suction valve and having a bleeder opening; and an oil pump connected to the propeller shaft and adapted to actuate said oil valve.

5. A gear shift associated with the motor, gear box, propeller shaft and clutch of an automobile and comprising: a pair of shift rods adapted to move the shift gears in said gear box; bevelled dogs resiliently arranged in said shift rods; a walking beam adapted to bear with its one or other end against the upper face of one or the other of said shift rods; a single fluid actuated piston; and an operative connection between said piston and both of said shift rods whereby the particular rod which is not locked by said walking beam is able to be shifted.

6. A gear shift associated with the motor, gear box, propeller shaft and clutch of an automobile and comprising: a pair of shift rods adapted to move the shift gears in said gear box; bevelled dogs resiliently arranged in said shift rods; a walking beam adapted to bear with its one or other end against the upper face of one or the other of said shift rods; a single fluid actuated piston; a whipple tree connecting said shift rods; a fluid actuated piston; and an operative connection between said piston and the central part of said whipple tree.

7. A gear shift associated with the motor, gear box, propeller shaft and clutch of an automobile and comprising: a pair of shift rods adapted to move the shift gears in said gear box; bevelled dogs resiliently arranged in said shift rods; a walking beam adapted to bear with its one or other end against the upper face of one or the other of said shift rods; a single fluid actuated piston; a whipple tree connecting said shift rods; a locking plate engageable with notches on said shift rods and actuated by movement of the clutch; a fluid actuated piston; and an operative connection between said piston and the central part of said whipple tree.

8. A gear shift associated with the motor, gear box, propeller shaft and clutch of an automobile and comprising: a pair of shift rods adapted to move the shift gears in said gear box; bevelled dogs resiliently arranged in said shift rods; a walking beam adapted to bear with its one or other end against the upper face of one or the other of said shift rods; a single fluid actuated piston; a whipple tree connecting said shift rods; a locking plate engageable with notches on said shift rods and actuated by movement of the clutch; a piston; a suction valve tubularly connected with the intake manifold of the engine and adapted to control the movement of said piston; and an operative connection between said piston and the central part of said whipple tree.

9. A gear shift associated with the motor, gear box, propeller shaft and clutch of a vehicle and comprising: a cylinder; a piston therein; a suction valve adapted to control the fluid flow into said cylinder; an operative connection between said piston and the gear box; a draw bar connected with said suction valve; a shoe on said draw bar; a bell crank cam having pair of radial faces along which said shoe is adapted to slide; and an operative connection between said cam and the shift rods of the gear box whereby one or the other of said shift rods is restrained in the one or other position of said cam.

10. A gear shift associated with the motor, gear box, propeller shaft and clutch of a vehicle and comprising: a cylinder; a piston therein; a suction valve adapted to control the fluid flow into said cylinder; an operative connection between said piston and the gear box; a draw bar connected with said suction valve; a shoe on said draw bar; a bell crank cam having a pair of radial faces along which said shoe is adapted to slide; a walking beam actuated by said cam and adapted to restrain the one or other of the shift rods of the gear box.

11. A gear shift associated with the motor, gear box, propeller shaft and clutch of a vehicle and comprising: a cylinder having ducts at opposite ends; a suction valve tubularly connected with the intake manifold of the engine and adapted to simultanously control the flow of fluid into and out of both of said cylinder ducts; a hand lever operatively connected with said suction valve; an oil pump driven by the propeller shaft; an oil valve actuated in a series of successive steps by the increase of oil pressure from said oil pump and also operatively connected with said suction valve; shift rods arranged in the gear box; a pair of resiliently movable dogs arranged in each of said shift bars; a walking beam adapted to engage with the one or other pair of dogs; a bell crank cam actuated by said suction valve and operatively connected with said walking beam; a whipple tree pivoted at opposite ends of said shift bars and centrally operatively connected with said piston; and a locking plate operatively connected with the vehicle clutch and adapted to engage with a series of notches on said shift bars.

In testimony whereof I affix my signature.

JOHN G. HANSON.